J. N. GAMEWELL, 2 Sheets—Sheet 1.

Assignor, by mesne assignments, to the GAMEWELL FIRE ALARM TELEGRAPH CO.

Non-Interfering Fire-Alarm Apparatus.

No. 8,891. Reissued Sept. 9, 1879.

Attest:

C. Clarence Poole

Raymond Barnes

Inventor:

J. N. Gamewell

By E. H. Ellsworth

His Attorney

2 Sheets—Sheet 2.

J. N. GAMEWELL,

Assignor, by mesne assignments, to the GAMEWELL FIRE ALARM TELEGRAPH CO.

Non-Interfering Fire-Alarm Apparatus.

No. 8,891. Reissued Sept. 9, 1879.

*Attest:*
C. Clarence Poole
Raymond Barnes

*Inventor*
J. N. Gamewell
By C. T. Ellsworth,
His Attorney.

UNITED STATES PATENT OFFICE.

JOHN N. GAMEWELL, OF HACKENSACK, NEW JERSEY, ASSIGNOR, BY MESNE ASSIGNMENTS, TO THE GAMEWELL FIRE ALARM TELEGRAPH COMPANY, OF NEW YORK CITY.

IMPROVEMENT IN NON-INTERFERING FIRE-ALARM APPARATUS.

Specification forming part of Letters Patent No. 113,649, dated April 11, 1871; Reissue No. 8,891, dated September 9, 1879; application filed August 13, 1879.

*To all whom it may concern:*

Be it known that I, JOHN N. GAMEWELL, of Hackensack, in the county of Bergen and State of New Jersey, have invented a new and useful Improvement in Automatic Signal-Boxes for Electro-Magnetic Fire-Alarm Telegraphs, of which the following is a specification, reference being had to the accompanying drawings, forming part of the same.

Figure 1:
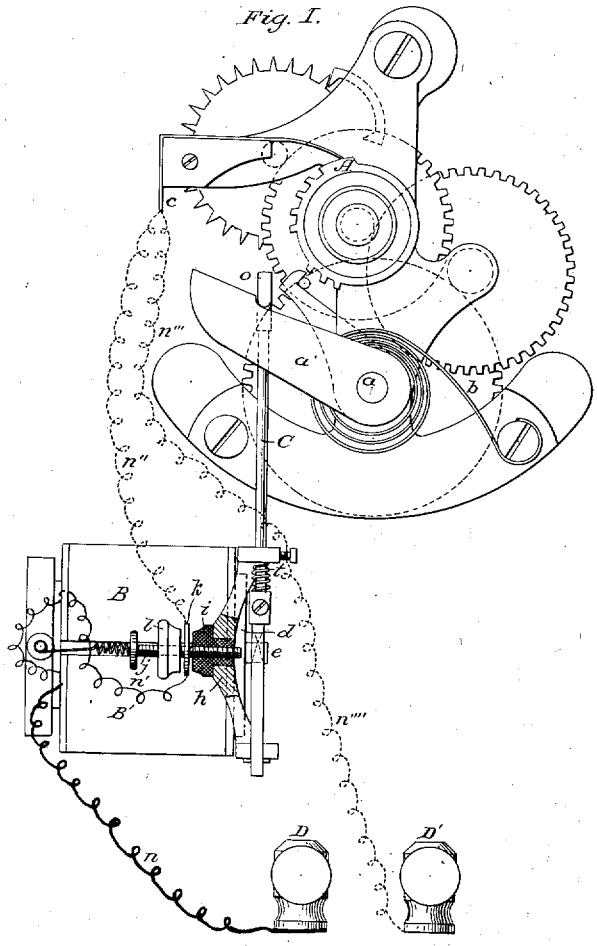
Figure 2:
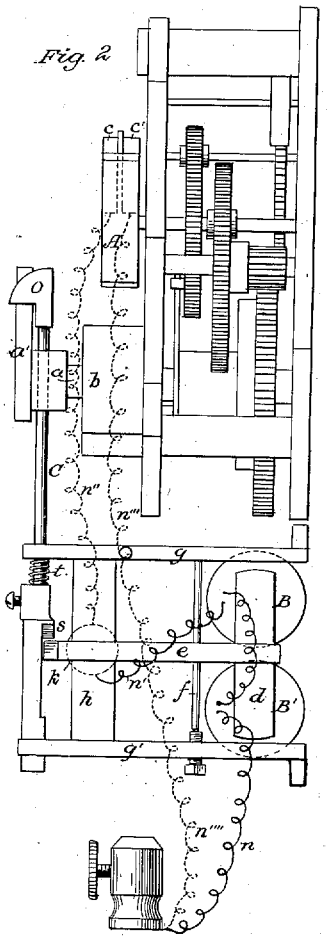
Figure 3:
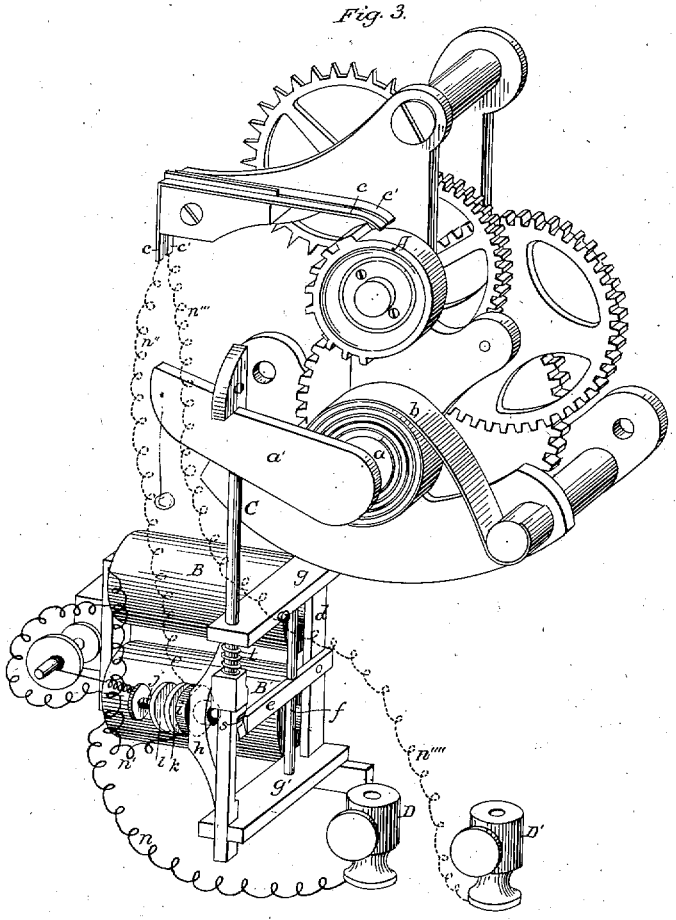

Figure 1 is a front elevation of a signal-box containing my improvement. Fig. 2 is a side elevation of the box, and Fig 3 is a perspective view of the same.

Similar letters of reference denote the same parts in the several figures of the drawings.

In order that the nature of my improvement may be the more readily understood, before describing it I will refer to the construction and operation of the signal-box and fire-alarm telegraph commonly in use.

The fire-alarm telegraph originated by Messrs. Farmer and Channing, of Massachusetts, now commonly in use in this country, consists of a number of telegraph-stations located at suitable distances apart within cities or villages, at points from which it may be thought advisable to give alarms of fire, all these stations being electro-telegraphically connected with a central station, or with each other, or both.

At each of the several stations within the electric circuit is placed what is called a "signal-box"—a piece of mechanism that is set in motion by a lever or crank which winds up a spring or weight, the reaction of which causes a movement of the mechanism that automatically breaks and closes the electric circuit at stated intervals and a given number of times. Within the electric circuit are also placed a number of alarm-sounders, so constructed and connected with the electric circuit that the breaking of a circuit causes a bell or gong to be struck, and thus an alarm to be given.

The alarm-sounders consist of an electro-magnet, forming part of the circuit, with its armature, and a gong or bell so connected with the armature of the magnet that when the circuit is broken, and the armature is thereby released from the magnet, its movement will set in motion mechanism that will strike a blow upon the gong or bell. The operation, therefore, of the signal-box is by breaking and closing the circuit to give an audible signal upon the alarm-sounders. This system is operated with a closed circuit—that is, the mechanism of the signal-boxes and the wires of the circuit are so constructed and arranged that the circuit is always closed, all the magnets in the circuit being thereby, of course, charged, and having their respective armatures drawn toward them and there held, except at the instant when, by the operation of some one of the signal-boxes, the circuit is broken, when, of course, all the magnets will be discharged, causing alarms to be struck upon all the alarm gongs or bells connected with them.

Now, it is evident that in the system arranged as above described the signal-boxes are liable to interfere with each other and cause confusion in the giving of signals. Much difficulty has been, in fact, practically experienced on this account. If at any time only a single signal-box is put in motion, a regular and orderly signal will be given; but when two or more signal-boxes are set in motion simultaneously, or if, while one is giving a signal, another is set in motion, there must necessarily occur a confused mingling of the signals throughout the entire circuit, thus tending to mislead and bewilder, instead of giving definite information.

The object of my invention is to obviate this difficulty and insure the orderly giving of signals by preventing the interfering of any signal-box with any other in the circuit.

This being my invention, I will now proceed to describe one form by which it may be carried into practical operation.

The general mechanism of the signal-box shown in the drawings need not be particularly described, as it is well known and in general use; but the parts to which special reference will be made are the break-circuit wheel and the non-interference mechanism.

All the circuit-breakers connected with the signal-boxes within my knowledge hitherto employed have been so constructed as, when used in what is called the "closed circuit," to maintain the circuit constantly closed, except when momentarily broken for the purpose of giving a signal, or, when used in what is called the "open circuit," to maintain the circuit constantly open, except when momentarily closed for the purpose of giving a signal.

My circuit-break wheel is so constructed and arranged that when standing at rest the circuit is closed, but the moment it starts to revolve the circuit is broken, thereby giving a signal, and remains broken until an instant before another signal is to be given, when it is closed and instantly broken again to give the signal, and so on during the entire revolution of the wheel, the circuit remaining open all the time, except momentarily the instant before the giving of signal and when the wheel comes to a state of rest, thus leaving the circuit closed.

A is the circuit-wheel, made of metal, fixed upon a shaft, by which it is connected with a train of wheels and an escapement, and to which motion is communicated by means of a mainspring, *b*, through another shaft, *a*, to which it is attached, and upon which is a driving-wheel that gives motion to the train. *a'* is a winding-lever fixed upon the shaft *a*. By pulling down this lever the spring is wound up and the train of wheels put in motion.

Upon the periphery of this break-circuit wheel, as is shown in the drawings, are a number of teeth or prominences, corresponding to the number of signals it is desired shall be given at each revolution of the wheel. Upon the wheel represented are five of these teeth in one group and three in another, designed to signal the number 53. The wire forming the circuit is severed, and the severed ends are connected one with each of the two metallic arms or springs *c c'*. These springs are insulated, and separated a little distance from each other, and therefore, in order to close the circuit, it is necessary to establish a connection between them. This is done across the face of the teeth upon the circuit-wheel whenever they are brought in contact with the teeth. The springs are secured in such a position that as the circuit-wheel is at rest they will be in contact with the first tooth of the group, and as the wheel is revolved they will successively come in contact with and pass over the face of all the teeth upon the wheel, but will touch the wheel at no other point; and it is evident that the circuit will be broken, and will remain broken and open during the entire revolution of the wheel, except during the momentary intervals when the springs are in contact with the teeth.

B B' is an electro-magnet placed in the circuit formed by the wires *n n' n'' n''' n''''*.

*d* is an armature attached to an arm or lever, *e*, that is pivoted and swings upon the shaft *f*, held between the brackets *g g'*. These brackets are connected by the cross-bar *h*. A hole is made through the center of this cross-bar, into which is fixed a broad-headed pin, *i*, made of hard rubber or some other substance that is a non-conductor of electricity, constituting it an insulator. Through this insulator passes the thumb-screw *j*, upon which is placed a metallic ring, *k*, and a jam-nut, *l*. The end of the thumb-screw extends a little way through the cross-bar *h*, so that the outer end of the arm *e* may come in contact with it when the armature swings away from the magnet.

*m* is a spiral spring, which acts to draw the outer end of the arm *e* into contact with the end of the thumb-screw.

The ring *k* is made part of the circuit, the wires *n' n''* being connected with it upon opposite sides, as shown in the drawings.

C is a rod, held and arranged to slide vertically up and down in holes made in the ends of the brackets *g g'*. At the top of this rod is a hoop, *o*, which projects over the winding-lever *a'*, with which it may engage. Upon the back side of this rod is a wedge-shaped lug or projection, *s*, so arranged with reference to the end of the arm *e*, which is also made wedge-shaped, that when the arm is in contact with the thumb-screw *j* and the rod C is forced downward it (the lug *s*) will press against the outside of the arm and lock and hold it in contact with the end of the thumb-screw, the armature, of course, being at the same moment thereby locked out of contact with the magnet; but if the rod is forced downward while the armature is drawn toward the magnet and the outer end of the lever *e* is swung to the opposite side of the lug *s*, then the armature will be locked to the magnet, and the outer end of the lever *e* will be locked out of contact with the thumb-screw *j*. *t* is a spiral spring on the rod C, acting to force it downward.

D D' are screw-cups, forming part of the general circuit that runs through and electrically connects all the stations and signal-boxes in a city or town with each other and with the battery. From the screw-cup D a wire runs to and forms the coils of a magnet, thence back to the lower side of the ring *k*. From the opposite side of the said ring the wire runs to one of the arms or springs, *c*, and from the other spring, *c'*, down to and is connected with one of the brackets, *g*, and thence back to the other screw-cup, D'. Thus, as will be seen, while the outer arm of the lever *e* is in contact with the end of the thumb-screw *j*, the break-circuit wheel is substantially cut out of the circuit, the direct and shortest route for the electric current being through the ring *k*, the thumb-screw *j*, the arm *e*, the shaft *f*, the bracket *g*, and that portion of the wire *n''''* running from the said bracket to the screw-cup D'; but when the arm *e* is not in contact with the thumb-screw *j* the circuit-wheel is necessarily in and forms part of the circuit, the electric current having to pass from the wire *n* to and through the magnet-coils; thence over the wire *n'* to the ring *k*; thence over the wire *n''* to the spring *c*; thence across the face of the circuit-wheel to the spring *c'*, and thence back to the cup D' over the wires *n''' n''''*.

The operation of a signal-box with the above-described form of break-circuit wheel and locking device is as follows, it being assumed that all the signal-boxes in the circuit are similarly constructed and arranged: Suppose all the boxes are at rest and in the position shown in Fig. 1. The circuit is now closed, and the armature being held in contact with the magnet, the outer end of the arm *e* will be swung away from contact with the thumb-screw *j* and to the right of the lug *s*. The hook *o* resting upon the winding-lever *a'*, the rod C is thereby held up, so that the lug *s* is up out of the way of the end of the arm *e*. A signal is now to be given, and to that end the winding-lever *a'* is depressed or pulled downward, winding up the mainspring, the recoil of which is to set the break-circuit wheel in motion. As the lever descends, and before the break-circuit wheel is put in motion, the rod C also descends, and the lug *s*, passing down on the inner or left side of the outer end of the arm *e*, locks it in that position, so that, until the rod is again raised, the lever cannot swing over into contact with the thumb-screw *j*, and thus, during the entire revolving of the break-circuit wheel in giving and repeating the signal, as well when the circuit is broken as when closed, the break-circuit wheel will be locked in the circuit. As soon, however, as the circuit-wheel begins to revolve the circuit will be broken, and so remain, except momentarily, while the springs are passing over the teeth on the periphery of the wheel, and, of course, during all the time that the circuit is broken the armature-levers in all the other signal-boxes in the circuit will be in contact with the thumb-screws corresponding to *j* in this box, and thereby their several break-circuit wheels will, during the time, be out of the circuit.

Suppose, now, that while a signal is being given by this box the attempt should be made to give a signal from any other in the circuit. It is plain that when the winding-lever of such box is depressed, the rod C, descending with it, will lock the armature-lever *e* in the position in which it is at the instant, and as it is certain to be in contact with the thumb-screw, except while the springs *c c'* are passing over the teeth of the break-circuit wheel of this box, it is clear that, unless the winding-lever of the other box should be depressed at the precise moment when the springs *c c'* are in contact with one of the teeth on this wheel, not only would no signal be given by the other box, but its own break-circuit wheel would be securely locked out of the circuit, and so remain until the winding-lever should return to its normal position, and by raising the rod release the armature-lever; and so it is evident that while a signal is being given by any boxes in the circuit the chances are exceedingly small that it can be interfered with by an attempt to signal from any other box in the circuit, all derangements or confusion of signals being thereby obviated.

The vast importance and value of such a result in fire-alarm telegraphing will be readily appreciated by all acquainted with the subject.

I am aware that a patent was granted to James M. Gardiner as assignee of Moses G. Crane, December 28, 1869, No. 98,352, for an improvement in signal-box mechanism for fire-alarm telegraphs, in which there is described a rotary circuit-wheel operated by a spring or weight and connected with the circuit by fingers resting on the face of the wheel, which is made to break the circuit by means of notches or insulators in its periphery. I do not claim, broadly, such a circuit-wheel.

Mr. Crane's wheel referred to keeps the circuit at all times closed, both when at rest and when in motion, except momentarily when it breaks the circuit for the purpose of giving a signal.

By my invention the circuit-wheel, as herein described, while it closes the circuit when at rest, as soon as it is put in motion it breaks the circuit and keeps it open until it has performed an entire revolution, except that it closes the circuit preparatory to breaking it for the purpose of giving a signal.

What I claim therefore, and desire to secure by Letters Patent, is—

1. The combination, with the boxes of an automatic fire-alarm-telegraph system, of non-interference mechanism, which, when one box of the circuit is signaling, operates in those boxes not signaling to prevent any of them from giving a signal by short-circuiting or cutting their signaling mechanism or break-circuit device out of the circuit, for the purpose specified.

2. The combination, with an automatic fire-alarm-telegraph apparatus, of non-interference mechanism and a pull or equivalent device for setting the apparatus in motion, whereby the motion of the pull operates to lock the break-circuit device in the electric circuit if at the moment when said pull is moved the circuit is closed, and to lock said break-circuit device out of the electric circuit if at the moment when said pull is moved the circuit is open, for the purpose specified.

3. The combination, with a fire-alarm-telegraph box and a break-circuit wheel, or equivalent device, of non-interference mechanism, whereby the box first commencing an alarm is made to control the circuit, so as to render the other boxes incapable of making a signal, for the purpose specified.

4. The combination, with a fire-alarm-telegraph box having signaling mechanism and an electro-magnet, of short-circuiting mechanism adapted to be set by the armature of the magnet to cut the signaling mechanism out of the circuit, if such mechanism is put in motion or an attempt is made to operate it during the time another box in the fire-alarm circuit is giving an alarm, for the purpose specified.

5. The combination, with a fire-alarm-telegraph box consisting of signaling mechanism operated by a suitable motor, of a pivoted short-circuiting lever, to cut the circuit-wheel out of the circuit when it is put in motion during the time another box is operating to give an alarm, for the purpose specified.

6. The combination, with the signal-box mechanism of fire-alarm telegraphs, of break-circuit mechanism adapted to close the circuit when at rest, and when in motion for signaling shall break the circuit and maintain it broken during the entire movement of such circuit-breaking mechanism, excepting for an instant before each signal, when it closes the circuit preparatory to breaking it, for the purpose of giving the signal.

7. In an automatic fire-alarm-telegraph apparatus, the combination of non-interference mechanism with the pull or device for starting the signaling mechanism, and with the armature of the magnet, which, when one box is sending a signal and the armatures in all the other boxes are released from their magnets by the breaking of the circuit, disables the starting device of any box not signaling from operating the signal mechanism to make alarm until the first box has completed its signal, for the purpose specified.

8. The combination, in a fire alarm-telegraph box, of non-interference mechanism with the signaling or break-circuit mechanism, said non-interference mechanism being arranged in position to start the signaling mechanism for making an alarm as long as the fire-alarm circuit remains closed, and to move out of position when the circuit is broken by the starting of a box, for the purpose specified.

J. N. GAMEWELL.

Witnesses:
B. S. CLARK,
E. A. ELLSWORTH.